Patented June 20, 1933

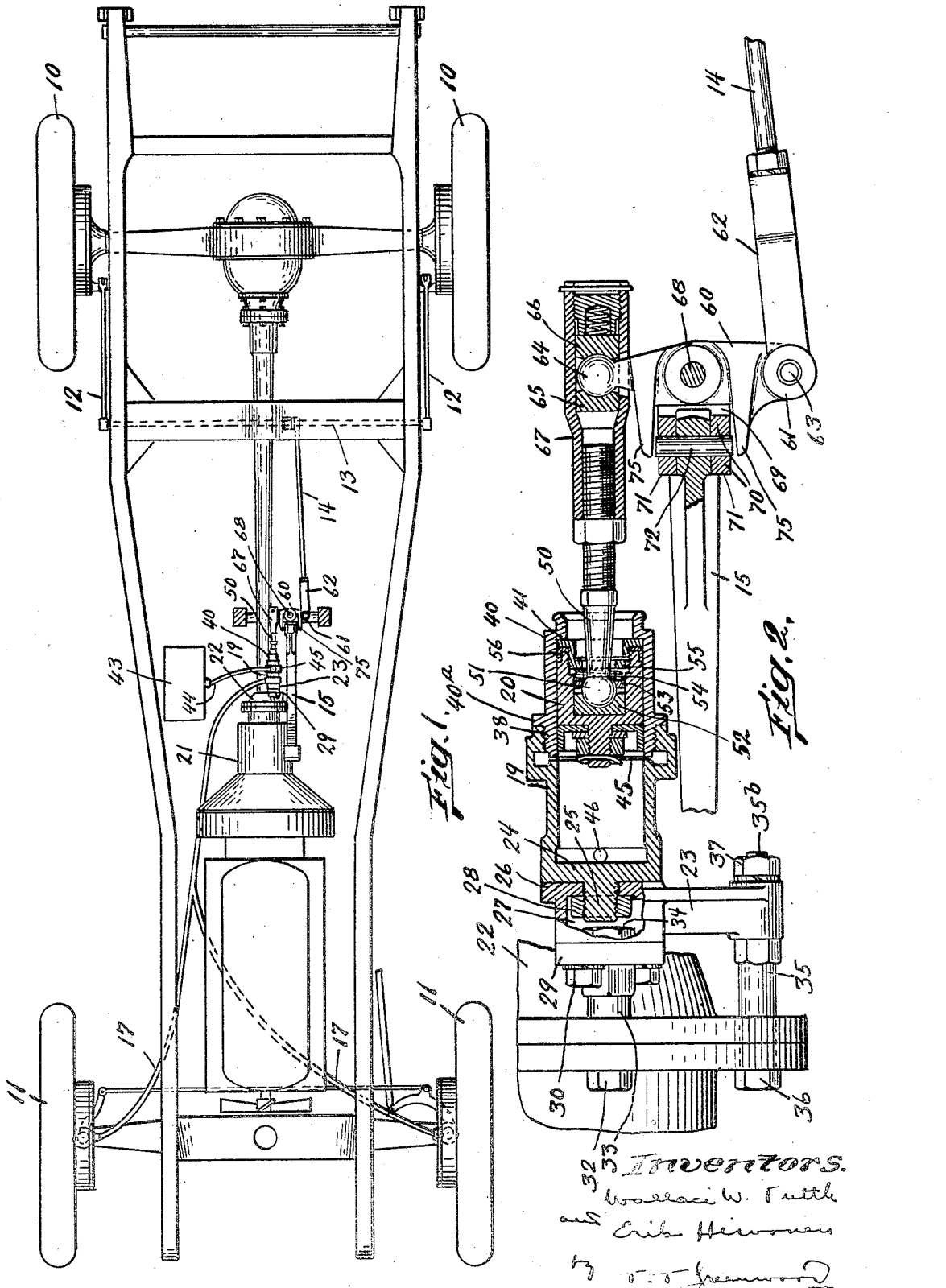

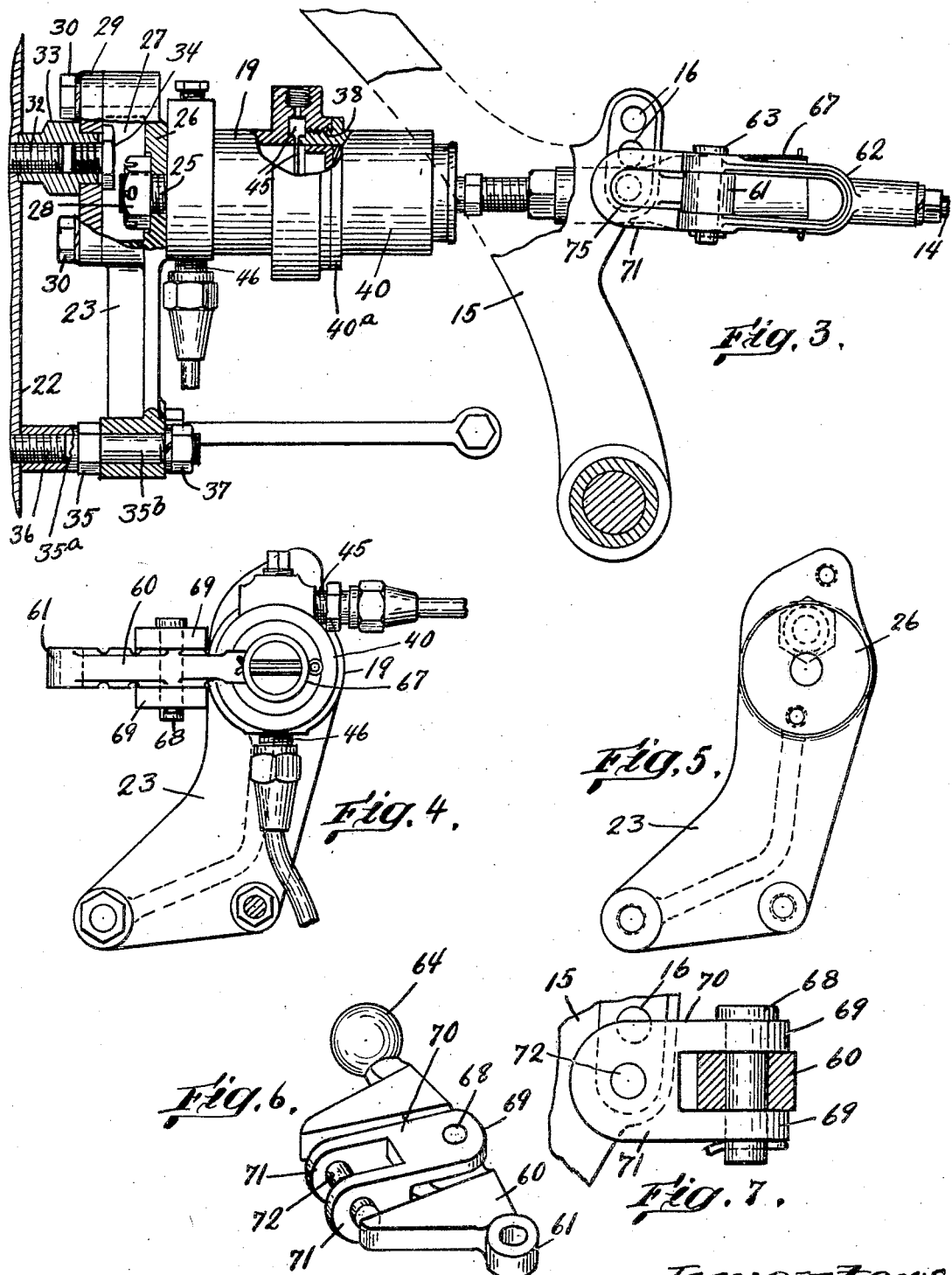

1,914,986

UNITED STATES PATENT OFFICE

WALLACE W. TUTTLE AND ERIK HIRVONEN, OF DETROIT, MICHIGAN; HENRY A. TUTTLE, ADMINISTRATOR OF SAID WALLACE W. TUTTLE, DECEASED, ASSIGNORS, BY MESNE ASSIGNMENTS, TO BENDIX BRAKE COMPANY, OF SOUTH BEND, INDIANA, A CORPORATION OF ILLINOIS

BRAKE MECHANISM

Application filed April 26, 1923. Serial No. 634,856.

This invention relates to brake mechanisms especially adapted for, although not necessarily restricted to automobiles, and has particular reference to brake mechanisms applied to all four wheels of the automobile.

In a four wheel brake system, the brakes on the forward or steering wheels may be operated simultaneously through an operating member, and the brakes on the rear wheels may also be operated simultaneously through a separate operating member; and both operating members may be operated simultaneously through a common manually controlled member actuated by the driver of the automobile. The forward and rear sets of brakes may both be mechanically-operated, or one set, as the forward set, may be hydraulically-operated.

An object of this invention is the provision of a brake system for a vehicle and including brakes on all four wheels, wherein pressure-equalizing means are disposed in the system to equalize the braking effect between the forward and rear sets of brakes; and also to permit the continued use of one set of brakes upon failure of the other set of brakes to operate.

A further object of this invention is the provision, as an attachment, of hydraulic brake mechanism to the front or steering wheels of a vehicle, the rear wheels of which are or may be provided with a set of mechanically-operated brakes, and connections between the two sets of brake-mechanisms and the common actuating member by which substantially uniform braking effect on all four wheels, and continued use of one set of brakes upon failure of the other set of brakes, is or may be secured.

A further object is generally to improve the construction and operation of brake mechanisms.

Fig. 1 is a plan view of the chassis of an automobile provided with brake mechanism embodying the invention.

Fig. 2 is an enlarged sectional plan view, in detail, through the pump-cylinder for the hydraulic brakes, and illustrating the pressure-equalizing means.

Fig. 3 is a side elevation, partly in section of the mechanism of Fig. 2.

Fig. 4 is a rear elevation of the pump-cylinder and pressure equalizing means.

Fig. 5 is a front elevation of the pump-cylinder adapter plate.

Fig. 6 is a perspective view of the pressure-equalizing mechanism.

Fig. 7 is a detail, partly in section, of the connection between the equalizing mechanism and the brake pedal.

As here shown, the invention is applied to an automobile having brakes on the rear wheels 10, and also on the forward, or steering, wheels 11. The rear wheel brakes may be of any suitable type and may be mechanically operated through the brake rods 12, which are connected with the cross-rod 13 and through the operating rod 14 which latter is connected with said cross-rod 13 to rotate it, and is also adapted for connection with the common actuating member, which may be the brake pedal 15. Said brake pedal may be formed or provided with a plurality of apertures 16 therein spaced at varying distances from the pivotal center of the pedal, and which are adapted to receive the operating rod connection, whereby varying degrees of brake leverage may be obtained.

The forward set of brakes may be of any suitable construction and, in this instance, are adapted to be actuated by hydraulic means, as by a hydraulic cylinder and piston associated with each wheel brake, in any suitable or desirable manner, not necessarily shown. Fluid connection with the brake-cylinders may be made by means including the fluid conductors 17, which are or may be flexible, at least in part, and said conductors extend to and are or may be in communication with a pump-cylinder 19, the piston 20 of which is arranged for actuation by the brake pedal 15, whereby the forward set of brakes may be applied simultaneously with the rear set of brakes.

The pump cylinder 19 may be disposed at any suitable location on the automobile and attached thereto in any suitable manner. As here shown, the cylinder is disposed in the rear of the transmission casing 21 of the automobile and attached to the universal joint housing 22. For this purpose, an adapter plate 23 is or may be interposed between said housing and the pump-cylinder and connected to both. Said cylinder may have an end wall 24 integral with the side wall thereof, and a screw-threaded member 25 extended forwardly of the end wall and co-axial with the cylinder. Said adapter plate 23 may be formed with a boss 26 on the rear face thereof against and on which said cylinder is secured, and said screw-threaded member 25 may extend through an aperture in said boss and into a recess 27 formed in the forward face of said adapter plate; and a nut 28 may be threaded on said screw-threaded member, whereby to clamp the cylinder to said adapter plate. A cover plate 29 may be secured by suitable means, as the bolts 30, to said adapter plate over said recess 27; and said cover plate may be secured to a bolt 32 of the housing 22 by means of the spacer block 33 and the bolt 34, which latter is or may be screw-threaded into said spacer block. The lower end of said adapter plate may be secured to and spaced from said housing 22 by suitable means, as the spacer member 35, which may have an internally screw-threaded end-recess 35a in which a bolt 36 of the housing is received, and a reduced extension 35b which is extended through an aperture in said adapter plate. A nut 37 may serve to clamp said plate fixedly to said spacer member.

The pump cylinder 19 is or may be open at the end and be formed with an internally screw-threaded end recess 38 which is or may be of greater diameter than the bore of the cylinder. An end cap 40 may be screw-threaded into said recess and said end cap may be formed or provided with an outwardly-directed flange 40a which is adapted to bear against the end of the cylinder whereby to define the axial position of the end cap with respect to the cylinder. The length of the recess is arranged to be slightly greater than the length of that portion of the end cap extended therein, whereby an annular channel 45 having preferably small axial length, is formed about the bore of the cylinder. Said end cap is arranged to receive the pump piston and has a diameter substantially equal to that of the pump cylinder. Said pump cylinder may be maintained filled with a suitable fluid, as oil, which may be supplied from an elevated reservoir 43 which is or may be in communication with the interior of the cylinder through the tube 44 and the annular channel 45. Said channel is adapted to be uncovered by the piston, at the outer part of its stroke, and be covered and thereby sealed by the piston during the forward or working stroke thereof. Said cylinder may be in constant communication with the brake-mechanisms and the fluid conductors 17 through the passage 46 disposed in the forward end of the cylinder. When the piston is moved forwardly in the cylinder, fluid contained within the cylinder is adapted to be forced into the wheel cylinders of the brake mechanisms and exert a pressure thereon to apply the brakes. When the piston of the pump-cylinder is moved rearwardly, the fluid is adapted to return to the pump-cylinder and release the brakes.

The pump-piston 20 is or may be universally pivotally connected with an operating rod 50 and the pivotal connecting means may include the spherically-formed end 51 of said rod which is received between two bearing plates 52 and 53, which plate may have spherically-shaped bearing seats and may be arranged within a recess in said piston. Said outer bearing plate 53 may be spring-pressed into engagement with the spherical end 51 of said operating rod; and the outer end of the spring 54 may bear against an abutment member 55. Said abutment member may be screw-threaded into the cylinder recess and may serve to clamp a piston packing 56 between it and the end of the piston.

Said piston-operating rod 50 and said rear-brake operating rod 14 are adapted to be interconnected through pressure-equalizing means with the brake pedal 15 in such a manner that both forward and rear sets of brakes may be applied substantially simultaneously and equally, and one set of brakes may continue to be effective in the event of failure of the other set.

Said pressure-equalizing means may include a bar 60 which is or may be formed with a boss 61 at one end thereof to which the yoke 62 of the operating rod 14 is adapted to be pivotally connected, as by the pin 63. The other end of said bar 60 preferably terminates in a spherically-shaped end-portion 64, as shown, which is adapted to be received between bearing plates 65 and 66, which latter are contained within the rear end of a sleeve 67; and said sleeve is or may be adjustably screw-threaded on the end of the piston-operating rod 50. This arrangement provides the piston-operating rod with a universal connection with said bar 60, as well as with the piston.

Said bar 60 is or may be formed or provided with an aperture through it intermediate the end-connections thereof, and the particular location of said aperture may be varied to suit the requirements for any given sets of brakes. A pivot pin 68 is or may be passed through said aperture and the legs 69 of a yoke 70, which legs are or may be disposed on opposite sides of said bar 60. Said yoke 70 is or may be formed with two forwardly-directed and spaced legs 71 which are disposed at right angles, or in a vertical plane, with respect to said other legs, and are adapted to receive the brake pedal 15 between them and be pivotally connected with said brake pedal by suitable means as a pivot pin 72 passed through said legs and an aperture 16 in said brake pedal. The arrangement provides a universal connection between said brake pedal and bar 60, whereby said bar 60 is permitted an angular movement in a horizontal plane and about the pivot pin 68, and a bodily movement in a vertical plane about the pivot pin 72.

As thus arranged, when the brake pedal 15 is actuated or moved toward the left, Fig. 2, and the resistance offered against the movement by both operating rods 50 and 14 is approximately equal, both rods will be moved without any appreciable angular movement of the bar 60 about its pivot pin 68. If, however, the resistance offered to the movement of one of said rods is greater than that offered by the other rod, then said bar 60 is adapted to fulcrum about said first rod and thereby increase the pressure on the second rod, until the pressure on both rods is or may be substantially equal.

Means are or may be provided to maintain one set of brakes effective in the event of failure of the other set of brakes. Said means may include the arms 75 which are or may be integral with said bar 60 and extend forwardly of said bar on opposite sides of said yoke 70. Said arms are adapted to be spaced a suitable distance from said yoke, whereby to permit a free and unrestricted equalizing movement between said yoke and bar 60, while both sets of brakes are effective. If, however, one of said sets of brakes becomes ineffective, through undue wear, or for other reasons, so that it offers a reduced resistance to the movement of the brake pedal, said bar 60 is adapted to be moved about its pivotal connection with the connecting rod associated with the effective set of brakes until one or the other of said arms 75 is moved against said yoke 70, or the pivot pin 72, whereby further angular movement of said bar is prevented and the braking movement of said brake pedal is transmitted through said arm 75 and bar 60 to the effective set of brakes.

While the invention is here shown as applied to the combination of mechanically and hydraulically operated brake mechanisms, and while a specific embodiment of the invention is shown for the purposes of illustration, it will be understood that the combination and arrangement of parts and the structure of the parts may be changed without departing from the spirit of the invention.

We claim:

1. Brake mechanism comprising the combination of two operating members, a common actuating member, and pressure equalizing means interconnecting said members comprising a bar pivotally connected at its ends with said operating members, a yoke pivoted to said bar intermediate thereof, and means pivotally connecting said yoke to said actuating member substantially at right angles to the pivotal connection between said yoke and bar.

2. Brake mechanism comprising the combination of two operating members, a common actuating member, and pressure equalizing means interconnecting said members comprising a bar pivotally connected at its ends with said operating members, a member pivotally connected to said bar intermediate the ends thereof, and means pivotally connecting said member to said actuating member substantially at right angles to the pivotal connection between said member and bar.

3. Brake mechanism comprising the combination of two operating members, a common actuating member, and pressure equalizing means interconnecting said members comprising a bar pivotally connected at its ends with said operating member, and a member pivotally connected to said bar intermediate the ends thereof, said bar having two arms disposed on opposite sides and spaced from said member for limiting its pivotal movement.

4. Brake mechanism comprising the combination of operating members for two sets of brakes, a common actuating member, a bar pivotally connected at its ends with said operating members, and having a universal connection intermediate its ends with said common actuating member, whereby said bar is adapted to pivot in engagement with all members, and means to limit such pivotal movement comprising arms carried by and etxended forwardly of said bar about said universal connection and disposed on opposite sides of and spaced from said actuating member in position to engage it.

5. Brake mechanism comprising the combination of two operating members, a common actuating member, and pressure-equalizing means interconnecting said members comprising a bar pivotally connected at its ends with said operating members, a yoke pivoted to said bar intermediate the ends thereof, and means pivotally connecting said yoke to said actuating member substantially at right angles to the pivotal connection between said yoke and bar, said bar having arms extended on opposite sides of and spaced from said yoke and arranged to be moved into engagement with said actuating member, whereby to limit the pivotal movement of said bar.

6. Brake mechanism comprising the combination of a mechanically-operated set of brakes having an operating member, a hydraulically-operated set of brakes having an operating cylinder and piston, an operating rod having universal connection with said piston, a common actuating member for both sets of brakes, and pressure-equalizing means comprising a bar having a pivotal connection with said operating member at one end having a universal connection with said operating rod at the other end, a yoke pivotally connected with said bar intermediate the ends thereof, and means pivotally connecting said yoke and actuating member at approximately right angles to the pivotal connection between said yoke and bar, said bar having a pair of arms extended forwardly on opposite sides of and spaced from said yoke and actuating member and arranged to be moved into engagement with said actuating member, whereby to limit the pivotal movement of said bar.

7. Brake mechanism comprising two sets of brakes, mechanical operating means for one set of brakes, hydraulic-operating means for the other set of brakes, a common actuating member for both means, and pressure-equalizing means interconnecting the aforesaid means and actuating member arranged to equalize the braking effect between said sets of brakes.

8. Brake mechanism comprising two sets of brakes, mechanical operating means for one set of brakes, hydraulic-operating means including a pump cylinder and piston for the other set of brakes, a common actuating member for applying pressure to said mechanical operating means and also to the piston of said pump, and pressure-equalizing means interconnecting said actuating member, piston and mechanical operating means arranged to equalize the braking effect between said sets of brakes.

9. A motor vehicle comprising, in combination, a set of two rear brakes, a set of two front brakes, a rock member and mechanical connections therefrom for operating one of said sets of brakes, a fluid pressure cylinder and piston and fluid power connections therefrom for operating the other set of brakes, equalizing means operatively connected with said rock member and with the piston aforesaid, and a driver operated member operatively connected with said equalizing means to thereby operate both sets of brakes.

10. A motor vehicle comprising, in combination, a set of two rear brakes, a set of two front brakes, a rock member and mechanical connections therefrom for operating one of said sets of brakes, a fluid pressure cylinder and piston and fluid power connections therefrom for operating the other set of brakes, an equalizer connected at one end to the rock member and at the other end to the piston, and a driver-operated lever connected to the equalizer.

11. A motor vehicle comprising, a set of rear brakes, a set of front brakes, a chassis frame having a cross member, a rock shaft paralleling the cross member and having an operating arm and which is connected at its opposite ends to the brakes of one set; a fluid pressure cylinder, fluid power connections from the cylinder to the other set of brakes, a piston in the cylinder, a thrust member connected to the piston, an equalizer bar connected at its opposite ends to the operating bar and thrust member, and a pedal connected to an intermediate part of the bar.

12. A braking system for vehicles having front and rear pairs of wheels comprising fluid pressure operated brakes on one of said pairs, mechanically operated brakes on the other of said pairs, and common means for manually applying said pairs of brakes simultaneously, one by fluid flow and the other independently of fluid flow.

13. A braking system for vehicles having front and rear pairs of wheels comprising fluid pressure operated brakes on one of said pairs, mechanically operated brakes on the other of said pairs, and means including an operable brake lever for manually applying said pairs of brakes simultaneously, the one by fluid flow and the other independently of fluid flow.

14. A braking system for a motor vehicle having a pair of front wheels and a pair of rear wheels, comprising a pair of brakes applied to said front wheels, a pair of brakes applied to said rear wheels, brake actuating mechanisms for one of said pair of brakes, a brake lever, tension elements transmitting the motion of said lever to said actuating mechanisms, fluid operated brake-actuating elements positioned so that their operation will apply the other said pair of brakes, a fluid conduit, a fluid pressure creating element connected by said fluid conduit with said brake-actuating elements, said fluid pressure creating element being so positioned and connected that movement of the brake lever to apply the first mentioned pair of brakes operates said fluid pressure creating element.

15. A braking system for motor vehicles comprising brakes applied to each of the four wheels of such vehicle, brake actuating mechanism for the rear wheel brakes, a brake lever, connecting rods transmitting the motion of said lever to the actuating mechanisms of the rear wheel brakes, fluid operated brake-actuating elements positioned so that their operation will apply the front wheel brakes, a fluid conduit, a fluid pressure creating element connected by said fluid conduit with said brake-actuating elements, said fluid pressure creating element being so positioned and connected that movement of the brake lever to apply the rear wheel brakes operates said fluid pressure creating element.

16. A braking system for motor vehicles comprising brakes applied to the four wheels of such vehicle, brake actuating mechanism for the rear wheels, a brake lever, connecting rods transmitting the motion of said lever to the actuating mechanisms of the rear wheel brakes, expansible brake-operating elements positioned so that their expansion will apply the front wheel brakes, a fluid pressure creating element connected by conduits with said expansible brake-operating elements, said fluid pressure creating element being so positioned and connected that movement of the brake lever to apply the rear wheel brakes operates said fluid pressure creating element.

In testimony whereof, we have signed our names to this specification.

WALLACE W. TUTTLE.
ERIK HIRVONEN.